Patented Nov. 20, 1951

2,575,896

UNITED STATES PATENT OFFICE 2,575,896

DIESTERS OF UNSATURATED DIHYDRIC ALCOHOLS AND PREPARATION OF THE SAME

Curtis W. Smith and Douglas G. Norton, Berkeley, Calif., assignors to Shell Development Company, San Francisco, Calif., a corporation of Delaware No Drawing. Application April 14, 1949, Serial No. 87,574

12 Claims. (Cl. 260—488)

This invention relates to novel organic compounds and to a method for the preparation of the same, and it more particularly relates to new unsaturated diesters and to a process for their preparation. In a specific aspect the invention relates to novel monocarboxylic acid aliphatic diesters of 1-alkene-1,3-diols and to a process for their preparation from monocarboxylic acid aliphatic diesters of 2-alkene-1,1-diols.

The novel esters which are provided by the invention have structures which may be defined generally by the formula

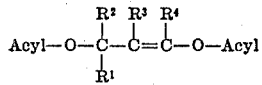

in which each of $R^1$, $R^2$, $R^3$ and $R^4$ represents a monovalent hydrocarbon radical or the hydrogen atom and $R^4$ preferably represents the hydrogen atom.

The provision of these novel esters, which as a class will be seen to be carboxylic acid diesters of 2-alkene-1,3-diols, is contemplated as an important object which has been accomplished by the present invention.

Another object of the invention is a process of general applicability for the preparation of these novel compounds. A more specific object of the invention is to prepare the new compounds of the invention particularly by a process involving catalytic isomerization of 1,1-diacyloxy-2-alkenes. Catalysts suitable for effecting the conversion of said 1,1-diacyloxy-2-alkenes to the new esters of the invention, and effective conditions for accomplishing the reaction also are important objects of the invention.

A still further object of the invention is novel esters which correspond to the structure above when the olefinic carbon atom disposed between the two carbon atoms to which the oxygen atoms are united (that is, the carbon atom to which $R^3$ is directly linked in the above fromula) is a tertiary olefinic carbon atom, i. e., an olefinic carbon atom having all of its valencies satisfied by direct union with carbon.

Other objects of the invention will become apparent hereinafter.

The process of the present invention is based upon the unexpected discovery that 1,1-diacyloxy-2-alkenes may be caused to react via an isomerization reaction, effected under the hereinafter described conditions of reaction and in the presence of a suitable catalyst, to form the new esters having structures represented by the formula above. Broadly stated, the process of the present invention comprises heating a 1,1-diacyloxy-2-alkene in the presence of a suitable catalyst at an elevated temperature which is conducive to the desired isomerization reaction. Substances which are suitable catalysts and which are employed in accomplishing the desired reaction according to the invention comprise broadly acid-reacting materials, such as acids per se, acid-reacting salts, and substances which react in situ under the conditions of the execution of the process to generate acids. Suitable acid-reacting materials which may be employed include generally, the inorganic acids, the organic acids that are stable under the conditions of reaction and of sufficient acid strength, acid-reacting salts, and the like. Among the inorganic acids which may be employed are included sulfuric acid, orthophosphoric acid, metaphosphoric acid, hydrochloric acid, nitric acid, sulfurous acid, selenic acid, hydrobromic acid, and like inorganic acids, preferably the strong mineral acids, but also including acids having acidic strengths less than that of the strong mineral acids. Organic acids which may be employed as the acid catalyst include, among others, oxalic acid, acetic acid, chloroacetic acid, dichloroacetic acid, trichloroacetic acid, arylsulfonic acids, such as para-toluenesulfonic acid, benzoic acid, picric acid, etc. Acid-reacting salts which may be employed as the catalyst include, among others, zince chloride, magnesium chloride, stannous chloride, sodium dihydrogen phosphate, sodium acid sulfate, iron chloride, and the like. The strong mineral acids have been employed with general and particular success and of these sulfuric and phosphoric acids are particularly preferred. The amount of the acidic catalyst that is employed will depend to a certain extent upon its identity, particularly upon its acidic strength, and upon the particular 1,1-diacyloxy-2-alkene that is employed in the process as well as upon the conditions under which the reaction is to be accomplished. The amount of the catalyst may be varied widely. Amounts of the strongly acidic catalysts, such as the strong mineral acids, less than about 2% by weight of the 1,1-diacyloxy-2-alkene, are generally effective. Somewhat greater amounts of the less strongly acidic catalysts are employed advantageously up to, say, 10% or more based upon the weight of the 1,1-diacyloxy-2-alkene. A general range within which the amount of the catalyst may be varied as desirable is from about 0.001% to about 15% by weight of the 1,1-diacyloxy-2-alkene. Amounts of the catalyst from about 0.1% to about 2% by weight of the 1,1-diacyloxy-2-alkene are especially suitable, particularly when a strong mineral acid is employed.

In accordance with the process of the invention, the conversion of 1,1-diacyloxy-2-alkenes to produce 1,3-diacyloxy-1-alkenes is accomplished by heating in the presence of the acidic catalyst at a temperature sufficiently elevated that the desired reaction occurs, but below a temperature above which there would ensue undesired side reactions, decomposition, or polymerization of either the reactant or the desired product. It has been discovered in accordance with the invention that temperatures of from at least about 70° C. and upwards, and particularly temperatures above about 90° C., are suitable for accomplishing the desired reaction. At temperatures lower than about 70° C., the conversion of the 1,1-diacyloxy-2-alkenes to the isomeric 1,3-diacyloxy-1-alkenes falls off rapidly as the temperature is decreased until at appreciably lower temperatures insignificant isomerization generally occurs. As the temperature is increased above about 70° C., the conversion of the 1,1-diacyloxy-2-alkenes to the desired 1,3-diacyloxy-1-alkenes under otherwise equal conditions increases rapidly with the temperature until an optimum temperature is attained. At excessively high temperatures, the yield of the 1,3-diacyloxy-1-alkene based upon the amount of the 1,1-diacyloxy-2-alkene consumed decreases, apparently as a result of side reactions. In general, temperatures up to about 200° C. may be employed, although as a maximum this value ordinarily is not critically limiting. A preferred maximum is about 150° C. The optimum range of temperatures will depend inter alia upon the particular 1,1-diacyloxy-2-alkene reactant that is employed and also upon the identity and the amount of the catalyst, etc. In general, the conversion of the 1,1-diacyloxy-2-alkenes wherein the acyl groups are residues of lower aliphatic monocarboxylic acids to produce 1,3-diacyloxy-1-alkenes wherein the acyl groups likewise are residues of aliphatic monocarboxylic acids, conducted in the presence of amounts of strong mineral acid from about 0.01% to about 1% by weight of the starting material may be accomplished most effectively at temperatures within the range of from about 90° C. to about 125° C.

It has been found that the presence of a small amount of the anhydride of the acid or acids from which the acyloxy groups of the starting material are derived favors improved yields of the desired products under any given conditions of reaction. Amounts of the acid anhydride up to about 25 mole per cent based upon the starting material may be included in the reaction mixture. For example, in the preparation of 1,3-diacetoxy-1-alkenes by the isomerization of 1,1-diacetoxy-2-alkenes, it is advantageous to include in the reaction mixture up to about 25 mole per cent of acetic anhydride based upon the amount of the 1,1-diacetoxy-2-alkene. In the preparation of 1,3-dibutyroxy-2-alkenes, the inclusion in the reaction mixture of up to about 25 mole per cent of butyric anhydride is correspondingly advantageous. While greater amounts of the acid anhydride may be present, no advantage ordinarily is gained by increasing the amount of acid anhydride to above about 25 mole per cent of the starting material. Amounts of the acid anhydride from about 5 to about 15 mole per cent of the starting material are preferred.

After completion of the reaction, the anhydride thus added to the reaction mixture may be recovered, if desired, during the purification of the products, for example by fractional distillation.

The reaction time required for conversion of the 1,1-diacyloxy-2-alkene to the 1,3-diacyloxy-1-alkene will depend to a certain extent upon the particular conditions under which the reaction is effected as well as upon the reactants and the catalyst that are involved. The time may be varied widely as desirable. Reaction times in excess of one-half hour have been employed effectively. In general, reaction times of from about one-quarter hour to about three hours are adequate, although longer or shorter reaction periods may be employed, if desirable.

The process of the invention whereby 1,1-diacyloxy-2-alkenes are converted to 1,3-diacyloxy-1-alkenes may be carried out in either a batch-wise, an intermittent or a continuous manner. The process may be conducted as a liquid phase operation, or in the case of reactants that are capable of existing in the vapor state under the conditions of the process, as a vapor phase process. Liquid phase operations are preferred. The catalyst as a solid or liquid, as the case may be, or a solution of the catalyst in an inert organic solvent, may be added to the 1,1-diacyloxy-2-alkene and the mixture heated at a suitable temperature for a period of time sufficient to effect the desired reaction. In the case of batchwise operations any suitable reaction vessel, preferably one adapted to be closed and to withstand the moderately elevated autogenous pressures that may arise, is employed. In continuous operations the catalyst may be added to or mixed with a stream of the 1,1-diacyloxy-2-alkene and the mixture passed in a continuous stream through a reaction vessel or a reaction tube maintained at reaction temperatures at a rate correlated with the dimensions of the vessel or reaction tube adapted to provide a suitable reaction time. Instead of adding the catalyst to the 1,1-diacyloxy-2-alkene and passing the mixture through a heated reaction zone, the acid-reacting catalyst may be in solid form and positioned in the reaction zone and the 1,1-diacyloxy-2-alkene passed therethrough in heated contact with the catalyst. Solid catalysts which thus may be employed include, for example, solid salts as well as catalysts composed of a supporting material such as kieselguhr, charcoal, clay, alumina or the like, impregnated, coated, or otherwise carrying the acid-reacting catalyst. Numerous suitable types of apparatus may be employed in carrying out the process of the invention and will be apparent to those skilled in the art. It will be understood that the invention is not regarded as being limited according to the particular type of apparatus used.

After completion of the reaction the catalyst, if dissolved or dispersed in the reaction mixture, desirably is neutralized as by the addition of a strong or weak base, a basic-reacting salt or the like in an amount substantially equivalent to the acidic material present. Alkalies, such as sodium carbonate, sodium acetate, sodium bicarbonate, or sodium hydroxide may be employed to neutralize the catalyst. An organic amine can be employed as the neutralizing agent, for example, diethylamine, tripropylamine, pyridine, piperidine, benzyltrimethylammoniumhydroxide, or the like. The 1,3-diacyloxy-1-alkene may be recovered from the reaction mixture if so desired, according to any appropriate method, such as by fractional distillation, by treatment with selective solvents, or the like. In general, fractional distillation is a particularly convenient method for accomplishing the recovery and is preferred.

The process of the present invention is broadly applicable to the isomerization of 1,1-diacyloxy-2-alkenes to produce 1,3-diacyloxy-1-alkenes according to the general equation:

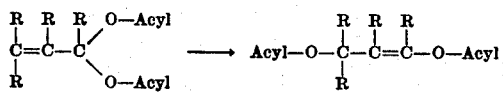

in which each R represents a member selected from the class consisting of the hydrogen atom and the hydrocarbon radicals. A particularly suitable group of 1,1-diacyloxy-2-alkenes which may be converted according to the process of the invention to valuable new 1,3-diacyloxy-2-alkenes is described by the first formula in the above equation when each R represents the hydrogen atom or a hydrocarbon radical less readily hydrogenated than an olefinic radical, i. e., an alkyl (examples thereof being methyl, ethyl, propyl, isopropyl, butyl, neopentyl, decyl, hexyl and homologs and analogs thereof), a cycloalkyl (such as cyclopentyl, cyclohexyl and ethylcyclohexyl) or an aryl, aralkyl or alkaryl radical (such as phenyl, benzyl, tolyl, phenethyl, naphthyl, etc.). Particularly desirable products are obtained according to the invention when the hydrocarbon groups which may be represented by R contain up to about 10 carbon atoms. It is desirable that the acyl groups represented in the foregoing formulas be the acyl residues of monocarboxylic acids, particularly monocarboxylic acids of the aliphatic type containing up to about 10 carbon atoms. Representative aliphatic carboxylic acids from which said acyl residues may be derived are, for example, acetic acid, propionic acid, butyric acid, valeric acid, isobutyric acid, caproic acid, capryllic acid, palargonic acid, capric acid, acrylic acid, methacrylic acid, crotonic acid, allylacetic acid, propylidineacetic acid, cyclohexene carboxylic acid, and the like and homologs and analogs thereof.

The 1,3-diacyloxy-1-alkenes provided by the present invention are generally liquid to solid products that are chemically reactive but that vary in their chemical characteristics to a certain extent according to the nature of the substituent groups represented by the several R's directly linked to the carbon atoms of the alkenylene residue. The 1,3-diacyloxy-1-alkenes that are carboxylic acid diesters of 1-alkene-1,3-diols containing a primary hydroxyl group and a tertiary alcoholic hydroxyl group, that is those compounds represented by the first formula given hereinabove when $R^1$ and $R^2$ represent hydrocarbon radicals and $R^4$ represents the hydrogen atom, are less stable in general than the carboxylic acid diesters of 1-alkene-1,3-diols wherein one hydroxyl group is primary in character and the second hydroxyl group is secondary in character, i. e., than those compounds represented by the first structural formula when $R^1$ (or $R^2$) represents the hydrogen atom and $R^2$ (or $R^1$) represents a hydrocarbon radical, and $R^4$ represents the hydrogen atom. Particularly desirable characteristics in the matter of chemical stability and utility are realized in the compounds defined by the general structural formula when $R^1$, $R^2$, and $R^4$ signify hydrogen and $R^3$ represents the hydrogen atom or a hydrocarbon radical, such as an alkyl radical, and the acyl radicals are acyl radicals of aliphatic monocarboxylic acids.

A valuable subgroup of novel esters of the invention is represented by the structural formula

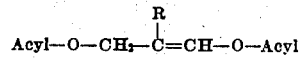

in which R represents an alkyl radical and the acyl radicals are derived from an aliphatic monocarboxylic acid containing from one to 10 carbon atoms inclusive. It will be noted that the subgroup is characterized by the presence of a tertiary olefinic carbon atom disposed between the two carbon atoms of the alkenylene radical to which the respective acyloxy groups are directly linked. The presence of a tertiary olefinic carbon atom in the specified position in the molecule desirably modifies the characteristic of the compounds and imparts thereto distinctive properties within the generic class of compounds provided by the invention.

A further valuable subgroup of compounds provided by the invention is defined by the structural formula first set forth hereinabove when $R^1$, $R^2$, and $R^4$ represent hydrogen, $R^3$ represents a hydrocarbon radical, such as alkyl, or the hydrogen atom, and the acyl radicals are acyl radicals of lower alpha,beta-olefinic aliphatic monocarboxylic acids, such as of acrylic or methacrylic acid. The esters within this subgroup wherein the acyl radicals are alike and contain a terminal methylene group in the beta position are valuable new polymerizable monomers which are useful as raw materials for the preparation of novel and distinctive polymers and resins. They may be polymerized by the action of heat and a polymerization catalyst, preferably one of the peroxide type, to form interesting new polymers which range in consistency from liquids through soft to hard brittle polymers. They may be copolymerized with known polymerizable vinyl compounds, such as vinyl halides, vinylidine halides, and acrylic and methacrylic acids and their derivatives, such as the esters or nitriles, to produce new and useful copolymers. Polymers and copolymers thus obtainable may be employed in the arts of surface coatings, for the preparation of solid formed objects, as by casting, by molding under heat and pressure, or other applicable known methods.

Representative compounds which are included by the invention and which can be prepared according to the process of the invention include the esters of saturated aliphatic monocarboxylic acids with diprimary 1-alkene-1,3-diols, such as 1,3-diacetoxypropene, 1-3-dipropion-oxypropene, 1,3 - dibutyroxypropene, 1,3 - divaleroxypropene, 1,3 - diacetoxy-2-methylpropene, 1,3 - diisobutyroxy - 2 - isobutylpropene, 1,3-divaleroxy-2-neopentylpropene, 1,3-dicaproxy - 2 - phenylpropene, 1,3-dienanthyloxypropene, 1,3-dicapryloxy-2-decylpropene, 1,3-diisobutyroxy-2-octylpropene, 1,3-divaleroxy-2-octylpropene, 1,3 - diacetoxy-1-butene, 1,3-dipropionoxy-2-methyl-2-pentene, 1,3-diisobutyroxy-2-isopropyl-1-pentene, 1,3-diformoxy - 2 - butene, 1,3 - divaleroxy - 2 - methyl-1-hexene, 1,3-dibutyroxy-2-ethyl-3-methyl - 1 - butene, and 1-butyroxy-3-caproxy-2-propyl-1-butene; esters of alpha,beta-olefinic aliphatic monocarboxylic acids with diprimary 1-alkene-1,3-diols such as 1,3-diacryloxypropene, 1,3-dimethacryloxy-2-methylpropene, 1,3 - dicrotonyloxy - 2 - neopentylpropene, 1,3-dimethacryloxy, 2-isopropylpropene, 1,3-diethacryloxy-2-isobutylpropene, 1,3 - bis(alpha - isopropylacryloxy) - 2 - methylpropene, 1,3-dimethacryloxy-2-octylpropene, 1,3-dicinnamyloxy-1-butene, 1,3 - ditiglyloxy-2-neopentylpropene, 1 - acryloxy-3-methacryloxy - 2-methylpropene, 1,3 - dimetharcryloxy - 2 - cyclohexylpropene, 1,3-bis(alpha-neopentylacryloxy) - 2-neopentylpropene, and the like and their homologs and analogs.

Diesters according to the invention wherein the acyl residues are from higher carboxylic acids, such as the long-chain fatty acids, can be prepared according to the process of the invention, or in some cases preferably by ester interchange between the long-chain fatty acid and the acetic or other lower fatty acid diester of the 1-alkene-1,3-diol. 1,3-distearyloxypropene, 1,3-dioleyloxy-2-neopentylpropene, and 1,3-dieleostearyloxy-2-propylpropene are exemplary of such higher diesters which are included by the generic invention.

The following examples will servve to illustrate certain of the numerous specific embodiments of the invention. It will be understood that the examples are presented for the purpose of illustrating rather than limiting the invention as it is more broadly disclosed herein and claimed in the appended claims.

Example I

A mixture of 250 parts by weight of 1,1-diacetoxypropene, 13 parts of acetic anhydride and 3.5 parts of a 10 per cent by volume solution of sulfuric acid in diethyl ether was heated in a closed, glass-lined reaction vessel for two hours at 110° C. The mixture was cooled and 1.3 parts of sodium acetate were added. The mixture was fractionally distilled. The fraction distilling between 89° C. and 93° C. under a pressure of 10 millimeters of mercury was separated and identified as 1,3-diacetoxypropene. The 1,3-diacetoxypropene was obtained in a yield, based on the amount of acrolein diacetate consumed, of 73.4 per cent and in a conversion of 1,1-diacetoxypropene to 1,3-diacetoxypropene of 21.2%.

Upon redistillation, the sample of 1,3-diacetoxypropene thus prepared was found to have a boiling point of 82° C. under a pressure of 5 millimeters of mercury, of 91° C.–92° C. under 10 millimeters of mercury, a refractive index $(n_D^{20})$ of 1.4384, and a density $(d_4^{20})$ of 1.095.

Example II

A mixture of 100 parts 1,1-diacetoxy-2-propene and 1.4 parts of a 10 per cent by volume solution of sulfuric acid in diethyl ether was passed as a continuous stream through a glass-lined reaction tube, at a temperature of 150° C., and at a rate providing a residence time at the reaction temperature of 10 minutes. The resultant mixture was cooled as it left the reaction tube and the sulfuric acid was neutralized by addition of sodium acetate. 1,3-diacetoxypropene was recovered by fractional distillation of the resultant mixture, in a conversion of 13 per cent.

Example III

A mixture of 101 parts of 1,1-diacetoxy-2-propene, 5 parts acetic anhydride, and 1.4 parts of a 10 per cent by volume solution of sulfuric acid in ether was heated for 10 minutes at 110° C. Triamylamine was added to the resultant mixture in an amount sufficient to neutralize the sulfuric acid. Upon fractional distillation of the neutralized mixture, 1,3-diacetoxypropene was recovered in 89 per cent yield and in a conversion of 23 per cent.

Example IV

A mixture of 100 parts of 1,1-diacetoxy-2-methyl-2-propene, 5 parts acetic anhydride, and 1.4 parts of a 10 per cent by volume solution of sulfuric acid in ether was heated at 150° C. for two hours. The mixture was cooled and sodium acetate was added in an amount equivalent to the sulfuric acid. The resultant mixture was subjected to fractional distillation at pressures between 1 and 10 millimeters of mercury. The fraction distilling between 92° C. and 95° C. under a pressure of 5 millimeters of mercury was separated and redistilled under a pressure of 2 millimeters of mercury. 1,3-diacetoxy-2-methylpropene was recovered as the fraction distilling at from 75° C. to 78° C. It was found to have a refractive index $(n_D^{20})$ of 1.4450.

The 1,1-diacyloxy-2-alkenes which are converted in accordance with the invention to new and useful 1,3-diacyloxy-1-alkenes may be prepared in any suitable manner, such as by the reaction of an alpha,beta-unsaturated aldehyde chloral or bromal with a carboxylic acid anhydride or by reaction of a metal salt such as a silver, lead or sodium salt of a carboxylic acid with and alkenylidine halide. A method which is particularly effective and convenient for the preparation of the 1,1-diacyloxy-2-alkene reactant comprises condensing an alpha-beta-unsaturated aldehyde with a carboxylic acid anhydride in the presence of a catalyst selected from the group including acids and acid-reacting substances such as sulfuric acid, oxalic acid, phosphoric acid, etc., or a metal halide such as stannous chloride, ferric chloride, stannic chloride, etc. The reaction between the alpha,beta-unsaturated aldehyde and the carboxylic acid anhydride may be effected in the presence of a suitable inert solvent, if desired. It is convenient to use a metal halide catalyst or a strong mineral acid and to conduct the reaction between the alpha,beta-unsaturated aldehyde and the carboxylic acid anhydride at relatively low temperatures. The temperature conveniently may be maintained below atmospheric temperature, for example, within the range of from about 0° C. to about 20° C. or slightly elevated temperatures may be employed, for example, up to about 50° C. The method of preparing 1,1-diacyloxy-2-alkenes by condensation of alpha,beta-unsaturated aldehydes with carboxylic acid anhydrides has been described in certain instances in the prior art and is generally applicable to the preparation of diesters which may be employed in the process of the present invention. The preparation of two 1,1-diacycloxy-2-alkenes by such condensation and their subsequent isomerization to produce novel 1,3-diacyloxy-2-alkenes is illustrated in the following examples.

Example V

To a mixture of 806 parts by weight of butyric anhydride containing 2.7 parts of sulfuric acid there was added over a period of one-half hour 280 parts of acrolein while the mixture was agitated and the temperature of the mixture was maintained between 30–40° C. The mixture then was stirred for an additional hour. At the end of this time, seven parts of sodium acetate were added to neutralize the catalyst and the mixture was fractionally distilled. 1,1- dibutyroxy-2-propene was separated in a conversion of 70% based upon the acrolein applied and a yield of 77% based upon the acrolein consumed as a fraction distilling at 89° C. under a pressure of 1.2 millimeters of mercury.

*Example VI*

A mixture of 300 parts by weight of 1,1-dibutyroxy-2-propene prepared as in the preceding example, 15 parts by weight of butyric anhydride and 0.25% by weight of sulfuric acid introduced in the form of a 10% solution of sulfuric acid in diethyl ether was prepared and heated in a closed glass vessel at 110° C. for 4 hours. The resulting mixture was removed from the vessel, the sulfuric acid was neutralized by the addition of 3 parts by weight of sodium acetate and the product was distilled. A 1,3-dibutyroxypropene cut was separated in two fractions, the first distilling at 78–81° C. under 1 millimeter mercury pressure and the second at 81° C. to 82° C. The two fractions were combined and redistilled under a pressure of one millimeter of mercury, the heart cut distilling at 81° C. being separated as purified 1,3-dibutyroxypropene. Analyses of the 1,3-dibutyroxypropene were as follows: Found, 61.66% carbon, 8.47% hydrogen, bromine number (grams $Br_2$/100 grams) 73.7; calculated, 61.66% carbon, 8.47% hydrogen, bromine number, 74.6.

*Example VII*

For the preparation of 1,1-dipropionoxy-2-neopentyl-2-propene, 254 parts by weight of alpha-neopentylacrolein were added over a period of one-half hour to a previously prepared mixture of 286 parts by weight of propionic anhydride and 1.35 parts of sulfuric acid while the temperature was maintained at between 31° C. and 40° C. After the addition of the alpha-neopentylocrolein the mixture was held between 40° C. and 45° C. for an additional hour. The sulfuric acid then was neutralized by the addition of 5 parts of sodium acetate and the resulting mixture fractionally distilled. 1,1-dipropionoxy-2-neopentyl-2-propene was separated as the fraction distilling under 0.1 millimeter of mercury between 87° C. and 93° C. Upon redistillation the 1,1-dipropionoxy-2-neopentyl-2-propene distilled at 71–72° C. under a pressure of 0.5 millimeter of mercury and was found to have a refractive index $(n_D^{20})$ of 1.4370.

*Example VIII*

A mixture of 197 parts of 1,1-dipropionoxy-2-neopentyl-2-propene, 10 parts of propionic anhydride and 1.45 parts by volume of a 10% solution of sulfuric acid in diethyl ether was prepared and heated in a sealed glass tube at 110° C. for 4 hours. The resulting mixture was withdrawn from the reaction vessel, the sulfuric acid was neutralized by addition of sodium acetate and the product was distilled. 1,3-dipropionoxy-2-neopentylpropene was separated as a fraction distilling between 121° C. and 128° C. under a pressure of 1.8 millimeters of mercury in a conversion of 17% based upon the 1,1-dipropionoxy-2-neopentyl-2-propene applied. Upon redistillation under a pressure of 0.5 millimeter of mercury the 1,3-dipropionoxy-2-neopentylpropene distilled at 90° C. Analyses of the product were as follows: Found, 65.75% carbon, 9.47% hydrogen, bromine number (grams $Br_2$/100 grams) 61.4; calculated, 65.60% carbon, 9.44% hydrogen, bromine number, 62.3.

In a manner similar to that illustrated in the foregoing examples, there can be prepared, for example, 1,3-dimethacryloxypropene from 1,1-dimethacryloxy-2-propene, 1,3-divaleroxy-2-phenylpropene from 1,1-divaleroxy-2-phenyl-2-propene, 1-acetoxy-3-butyroxypropene from 1-acetoxy-1-butyroxy-2-propene, 1,3-dicapryloxy-2-neopentylpropene from 1,1-dicapryloxy-2-neopentyl-2-propene and homologous and analogous 1,3-diacyloxy-1-alkenes from corresponding 1,1-diacyloxy-2-alkenes.

The new unsaturated esters provided by the present invention are useful as chemical intermediates, as biologically active compounds or intermediates for the preparation of biologically active compounds, as special solvents and in some cases as polymer intermediates. A noteworthy application of the novel diesters resides in their conversion to diesters of 1,3-glycols by hydrogenation, which products in turn may be converted to the free glycols by hydrolysis of the ester groups according to known methods. It is an unexpected characteristic of the novel diesters that they may be preferentially hydrogenated at the olefinic bond of the alkenylene residue to form with a minimum of side or degradative reaction diesters of the saturated glycols. Thus, it is known from the prior art that the isomeric 1,1-diacyloxy-2-alkenes, when treated with hydrogen in the presence of a hydrogenation catalyst under suitable conditions, form in substantial measure unsaturated monoesters resulting from hydrogenalysis of the diester molecule. In contrast to this known characteristic of the 1,1-diacyloxy-2-alkenes, hydrogenation of the 1,3-diacyloxy-1-alkenes has been successfully carried out in the absence of predominant reaction leading to fission of the molecule, to form by preferential saturation of the olefinic bond diesters of the corresponding saturated 1,3-glycols.

For accomplishing the hydrogenation there may be employed any suitable hydrogenation catalyst of types well known to the art and comprising metals or compounds of metals, such as for example platinum, vanadium, nickel, cobalt, tungsten, molybdenum, cerium, thorium, chromium, zirconium, their oxides and/or their sulfides. Alloys or mixtures containing one or more such metals, as silver-copper alloys, copper-chromium alloys, copper-zinc alloys, nickel-copper alloys, etc., may be employed. For accomplishing the hydrogenation there preferably is employed a base metal hydrogenation catalyst, such as the active nickel hydrogenation catalyst known to the art as Raney nickel. The catalyst preferably is devoid of alkali or alkaline reacting materials. Hydrogenation pressures from atmospheric pressure up to 200 pounds per square inch or more can be employed. Pressures as high as 3000 pounds per square inch may be used. While the hydrogenation of the 1,3-diacyloxy-1-alkenes to saturate the olefinic bond may be conducted at temperatures as low as room temperatures, temperatures up to about 150° C. or more can be used. The hydrogenation may be effected in the presence of an inert solvent such as an ether, an alcohol or a hydrocarbon solvent. By virtue of the unique properties of the novel diesters, which properties make possible their preferential hydrogenation as aforesaid, the novel compounds find extensive utility as intermediates for the preparation of saturated glycols and derivatives of saturated glycols, many of which heretofore could have been prepared only at considerably greater difficulty and expense.

This application is a continuation-in-part of our allowed U. S. application Serial No. 709,085, filed November 12, 1946, now forfeited.

We claim as our invention:

1. A process of preparing 1,3-diacetoxypropene which comprises heating 1,1-diacetoxy-2-propene at a temperature from about 90° C. to about 125° C. in the presence of from about 0.1 per cent to about 2 per cent by weight of a strong mineral acid.

2. A process of preparing 1,3-diacetoxy-2-methylpropene which comprises heating 1,1-diacetoxy-2-methyl-2-propene at a temperature from about 90° C. to about 125° C. in the presence of from about 0.1 per cent to about 2 per cent by weight of a strong mineral acid.

3. A process of preparing a 1,3-diacetoxy-1-alkene which comprises heating a 1,1-diacetoxy-2-alkene in the liquid phase at a temperature from about 70° C. to about 200° C. in the presence of an acidic catalyst present in an amount up to about 10 per cent by weight of the 1,1-diacetoxy-2-alkene.

4. A process of preparing a 1,3-diacetoxy-2-alkylpropene which comprises heating a 1,1-diacetoxy-2-alkyl-2-propene at a temperature from about 70° C. to about 200° C. in the presence of from about 0.1 per cent to about 15 per cent by weight of an acidic catalyst.

5. A process of preparing 1,3-diacyloxy-1-alkenes wherein the acyl groups are acyl residues of lower aliphatic monocarboxylic acids which comprises heating 1,1-diacyloxy-2-alkenes wherein the acyl groups are acyl residues of lower aliphatic monocarboxylic acids at a temperature from about 70° C. to about 200° C. in the presence of from about 0.1 per cent to about 15 per cent by weight of an acidic catalyst.

6. A process of preparing 1,3-diacyloxy-1-alkenes wherein the acyl groups are acyl residues of lower aliphatic monocarboxylic acids containing up to ten carbon atoms which comprises heating 1,1-diacyloxy-2-alkenes wherein the acyl groups are acyl residues of lower aliphatic monocarboxylic acids containing up to ten carbon atoms at a temperature from about 70° C. to about 200° C. in the presence of from about 0.1 to about 2 per cent by weight of a strong mineral acid.

7. A process of preparing a 1,3-diacetoxy-1-alkene which comprises heating a 1,1-diacetoxy-2-alkene at a temperature from about 70° C. to about 200° C. in the presence of an acidic catalyst and from about 5 to about 15 mole per cent of a carboxylic acid anhydride based upon the amount of the 1,1-diacetoxy-2-alkene.

8. A process which comprises heating a 1,1-diacyloxy-2-alkene wherein the acyl groups are aliphatic monocarboxylic acid acyl residues at a temperature from about 70° C. to about 200° C. in the presence of an acidic catalyst to produce a 1,3-diacyloxy-1-alkene isomeric with and having the acyl residues of said 1,1-diacyloxy-2-alkene.

9. 1,3-diacetoxy-2-methylpropene.

10. 1,3-diacyloxy-2-methylpropenes, the acyl groups being acyl residues of lower aliphatic monocarboxylic acids.

11. A diester of an unsaturated aliphatic monocarboxylic acid with a lower 2-alkylpropene-1,3-diol.

12. An aliphatic monocarboxylic acid diester of an unsubstituted lower alkene diol characterized in that in said ester one of the esterified hydroxyl groups is directly linked to a saturated carbon atom which is directly linked by an aliphatic carbon-to-carbon univalent bond to a second, tertiary carbon atom, which second, tertiary carbon atom is in turn directly linked to a lower alkyl group and by an aliphatic carbon-to-carbon double bond to a third carbon atom, and that the second of the two esterified hydroxyl groups is directly linked to said third carbon atom.

CURTIS W. SMITH.
DOUGLAS G. NORTON.

REFERENCES CITED

The following references are of record in the file of this patent:

Kirrmann, Bull. Soc. Chim. (5), 4, 503 (1937).